(12) United States Patent
Stelling et al.

(10) Patent No.: US 7,213,268 B2
(45) Date of Patent: May 1, 2007

(54) METHOD FOR CONTROLLING CUSTOMER-IMPLEMENTED DATA UPDATES

(75) Inventors: Desi Stelling, Glendale, AZ (US);
Timothy Schulze, Lanesville, IN (US);
Vance Walker, Anthem, AZ (US)

(73) Assignee: Aviation Communication and Surveillance Systems, LLC, Phoenix, AZ (US)

( * ) Notice: Subject to any disclaimer, the term of this patent is extended or adjusted under 35 U.S.C. 154(b) by 866 days.

(21) Appl. No.: 10/627,489

(22) Filed: Jul. 25, 2003

(65) Prior Publication Data

US 2005/0039006 A1 Feb. 17, 2005

(51) Int. Cl.
*H04L 9/32* (2006.01)

(52) U.S. Cl. .................... 726/26; 713/191; 705/59
(58) Field of Classification Search .................. 726/31; 713/191
See application file for complete search history.

(56) References Cited

U.S. PATENT DOCUMENTS

| | | | |
|---|---|---|---|
| 4,937,863 A | 6/1990 | Robert et al. | |
| 5,103,476 A | 4/1992 | Waite et al. | |
| 5,805,699 A | 9/1998 | Akiyama et al. | |
| 5,903,650 A | 5/1999 | Ross et al. | |
| 5,905,860 A | 5/1999 | Olsen et al. | |
| 5,982,889 A | 11/1999 | DeMont | |
| 6,006,190 A | 12/1999 | Baena-Arnaiz et al. | |
| 6,044,469 A | 3/2000 | Horstmann | |
| 6,108,420 A | 8/2000 | Larose et al. | |
| 6,173,403 B1 | 1/2001 | DeMont | |
| 6,189,146 B1 | 2/2001 | Misra et al. | |
| 6,219,652 B1 | 4/2001 | Carter et al. | |
| 6,226,618 B1 | 5/2001 | Downs et al. | |
| 6,226,747 B1* | 5/2001 | Larsson et al. ............... 726/31 |
| 6,233,567 B1 | 5/2001 | Cohen | |
| 6,289,452 B1 | 9/2001 | Arnold et al. | |
| 6,363,357 B1 | 3/2002 | Rosenberg et al. | |
| 6,438,468 B1 | 8/2002 | Muxlow et al. | |
| 6,460,023 B1* | 10/2002 | Bean et al. ................... 705/54 |
| 6,460,140 B1 | 10/2002 | Schoch et al. | |
| 6,487,717 B1 | 11/2002 | Brunemann et al. | |
| 6,973,479 B2* | 12/2005 | Brady et al. ................. 709/203 |
| 2002/0111720 A1 | 8/2002 | Holst et al. | |
| 2003/0003872 A1* | 1/2003 | Brinkley et al. .............. 455/66 |
| 2003/0069015 A1* | 4/2003 | Brinkley et al. ............ 455/431 |

* cited by examiner

*Primary Examiner*—Matthew Smithers
(74) *Attorney, Agent, or Firm*—Bradley K. DeSandro; Lewis and Roca LLP

(57) ABSTRACT

A method is described for controlling customer installations of software or data by providing to the customer an encrypted list of authorized installation targets, whereby the installation program reads and decrypts the list, and only allows installation to proceed if the customer's installation target has a serial number that matches one of the vendor-provided serial numbers in the authorization list. Provision is also made for allowing customers to add serial numbers to the list, within constraints predetermined by the software vendor. Also provided is a method for a customer to perform a predetermined number of installations, whereby the software maintains and decrements a counter in an encrypted file on a storage medium, keeping track of how many remaining installations a customer may perform.

22 Claims, 5 Drawing Sheets

METHOD FOR CONTROLLING CUSTOMER-IMPLEMENTED DATA UPDATES

BACKGROUND OF THE INVENTION

1. Field of the Invention

The present invention relates generally to methods for customer-based data and software distribution, and more particularly, to customer-installation of data or software in avionics equipment.

2. Description of the Related Art

With today's crowded airspace and demanding timelines, the safe and efficient operation of aircraft presents many challenges. To address those challenges, manufacturers have designed modern aircraft to rely on an increasingly sophisticated collection of embedded electronics assemblies to assist in flight management, aircraft operation, and navigation. However, to ensure accuracy of terrain data and quality of software, many of these embedded electronics assemblies, often referred to as Line Replaceable Units (or LRUs), must undergo periodic maintenance through data upload or software upgrade.

Originally, airline maintenance personnel upgraded flight management computers by using an ARINC standard 603 portable tape upload device, but such tape loaders were clumsy and slow. Manufacturers then progressed to data loading computers that were based on ARINC standard 615 (Data Loader standard), which is in essence a software protocol layered onto an ARINC standard 429 data bus. ARINC 615 data loaders abandoned the tape format of ARINC 603 in favor of a 3.5-inch floppy diskette medium for transferring data and software.

Many airlines today provide data or software updates to their aircraft by connecting an ARINC Standard 615-compliant portable data loader to the LRUs in their aircraft, or by feeding floppy diskettes to an ARINC 615-compliant airborne data loader built into the aircraft. The software or data for these updates has grown increasingly more complex as the systems in aircraft provide more functionality to the cockpit crew and traffic control.

The high cost of creating software is a well-established fact. Likewise, it is well known that the ease of copying software presents a significant risk factor in software vendors' ability to recover their investments in the development of sophisticated software applications and databases. Further complicating the matter, since special-purpose software has a smaller consumer base than general-purpose software, the development costs must be amortized over fewer products. As a result, the price for special purpose software is often much higher per installation than general purpose software such as a personal computer operating system, and in some cases may be more than an order of magnitude more expensive. However, the higher price of the software also increases the likelihood of unauthorized copying or distribution. With the high opportunity cost of losing sales to piracy, software vendors face a difficult challenge in recovering their investment and continuing to remain profitable.

One shortcoming in prior art techniques for aviation software upgrades is the inability to specify a specific piece of flight hardware that the aircraft customer is authorized to upgrade. Another shortcoming in prior art techniques is the inability to limit the customer-performed software or data upgrades to a finite number of installations. Yet another shortcoming in prior art techniques is the ability for the customer to specify a limited number of software installation targets based on a pre-authorized number of installations.

What is needed then, is a method for software vendors to prevent piracy of their products while allowing customers the flexibility to continue to perform installations of software or databases in the desired target platforms.

SUMMARY OF THE INVENTION

It is an object of the present invention to improve various problems associated with the prior art.

It is yet another object of the invention to provide a method for allowing customers to install software products only to authorized target platforms.

It is yet another object of the invention to provide a method for allowing customers to add their own serial numbers to an authorization list, constrained by limits imposed by the software vendor It is yet another object of the invention to allow customers to perform a predetermined number of installations without vendor intervention.

Briefly, the present invention provides a method for controlling customer installations of software or data by providing to the customer an encrypted list of authorized installation targets, whereby the installation program reads and decrypts the list, and only allows installation to proceed if the customer's installation target has a serial number that matches one of the vendor-provided serial numbers in the authorization list. Provision is also made for allowing customers to add serial numbers to the list, within constraints predetermined by the software vendor. Also provided is a method for a customer to perform a predetermined number of installations, whereby the software maintains and decrements a counter in an encrypted file on a storage medium, keeping track of how many remaining installations a customer may perform.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed. Thus, the present invention comprises a combination of features, steps, and advantages that enable it to overcome various deficiencies of the prior art. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of a preferred embodiment of the present invention, reference will now be made to the accompanying drawings, which form a part of the specification, and wherein.

DETAILED DESCRIPTION OF THE PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1:
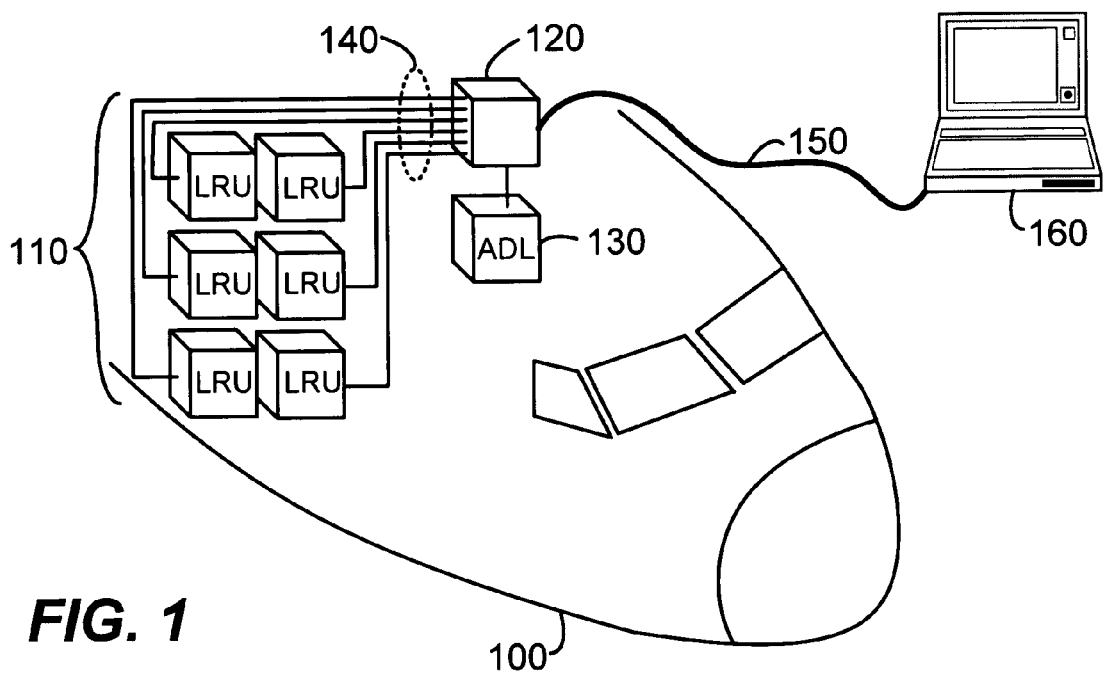
FIG. 1 is a characterization of a typical hardware configuration in an aircraft avionics environment that implements the methods of the present invention.

Referring initially to FIG. 1 there is shown a typical system where the present invention may be implemented. Vehicle 100 comprises a collection of electronic and computer assemblies 110, 120, and 130 that are electrically interconnected. Vehicle 100 is shown as an aircraft, but may represent any number of vehicles such as helicopters, spacecraft, watercraft, busses, taxis, or the like. In the illustrative embodiment, user-upgradable electronics assemblies, or installation targets 110 are implemented in an avionics environment through ARINC-compatible line replaceable units (LRUs); the term "LRU" is used interchangeably herein with the term "installation targets." Some illustrative examples of LRUs include aircraft condition monitoring systems (ACMS), terrain awareness warning systems (TAWS), digital flight data acquisition units (TFDAU) or traffic alert and collision avoidance systems (TCAS). LRUs 110 electrically connect to other components through a collection of busses 140 such as those described in ARINC Standard 429. In FIG. 1, the busses 140 connect the LRUs 110 to a switch panel 120 that can be used to electrically connect buses 140 to an airborne data loader 130 or through a temporary connection 150 to an ARINC 615-compliant portable data loader 160. Those of skill in the art would recognize that connection 150 could be established in a wireless environment, where wireless transceivers such as those utilized in the 802.11b WiFi standard are connected to switch panel 120 and data loader 160. Alternatively, the electrical connections between airborne the data loader 130 and the switch panel 120 as well as the electrical connection 150 may be implemented through an ARINC 429 bus, or through an Ethernet interface as defined in ARINC specification 615A-1 or 615A-2. By mechanically or electronically selecting a switch position in switch panel 130, data loader 160 may be connected to any one of several LRU's 110 in the vehicle 100. Once a connection is established, software or data may be downloaded from the data loader 160 to an LRU 110 or from an LRU to the data loader 160. In an alternate embodiment, the switch panel 120 is configured to connect the airborne data loader 130 to an LRU 110, whereby software upload or download may be accomplished.

Figure 2:
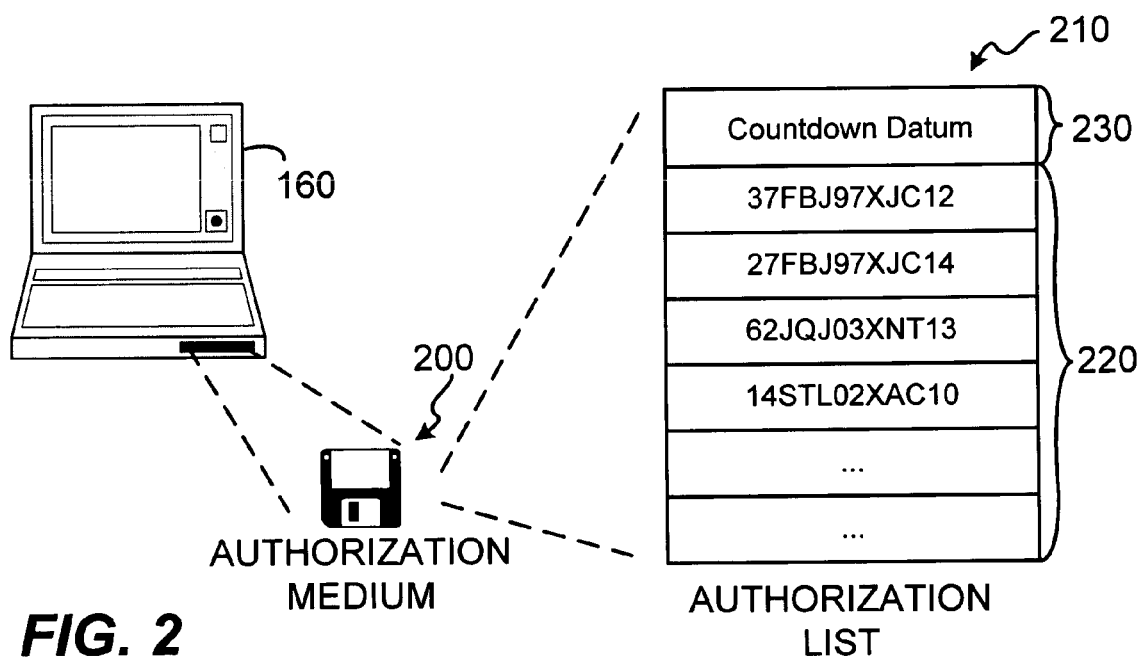
FIG. 2 illustrates one implementation of an authorization list and its relation to a data loader.

Turning to FIG. 2, the data loader 160 is typically a portable computer-based device. Data loaders as utilized in one embodiment of the present invention are defined in more depth in ARINC specifications 615-3, 615-4, 615-A1, and 615-A2, all incorporated herein by reference. For example, a data loader may be created by configuring a personal computer or laptop with an ARINC standard 429-compatible bus card (such as through an ISA, PCMCIA, or PCI interface in the computer), and installing appropriate software to allow the computer to interact with an LRU through the bus card. Alternatively, pre-configured data loaders may be obtained from manufacturers such as Condor Engineering, or Tech S.A.T. Data loader 160 accommodates removable digital storage media such as 3.5 inch diskettes, CD-ROMs, DVDs, DVD-ROMs, DVD-Rs, DVD RWs, DVD+RWs, bernoulli-type disks such as ZIP Disks or semiconductor-based memory devices such as Flash-based memory cards, Secure Digital memory cards, SanDisks, Smart Media cards, Memory Sticks, or the like. In one embodiment of the present invention, software or data that is to be uploaded to LRUs 110 is stored on such removable storage media, and an installation program operating in data loader 160 prompts a user to insert removable media until an entire installation or load set has been entered. In one embodiment of the invention, the authorization medium 200 is one of such removable storage media, but as appreciated by those of skill in the art, may comprise other types of removable storage media, or may be downloaded onto the hard drive of data loader 160. The authorization medium 200 comprises an authorization list 210 that in one embodiment, is encrypted in a manner that only software provided by the vendor of a set of installation disks may decrypt. Those of skill in the art appreciate that the encryption algorithms referred to in regards to this specification may be implemented through any one of a number of commonly used algorithms, such as DES, PGP, RSA, Rabin, elliptic curve encryption, El Gamal, or bitwise XOR techniques. The authorization list 210 is stored on the authorization medium 200, and is comprised of either a list of alphanumeric serial numbers 220, a countdown datum 230, or both. In one embodiment, countdown datum 230 is an integer value that is pre-set by the software vendor. In another embodiment, serial numbers 220 are also pre-set by the software vendor. In yet another embodiment, serial numbers 220 may be supplied, in whole or part, by the software customer, in a manner (as described below) that limits the number of authorized serial numbers that can be added to the authorization list.

Figure 3:
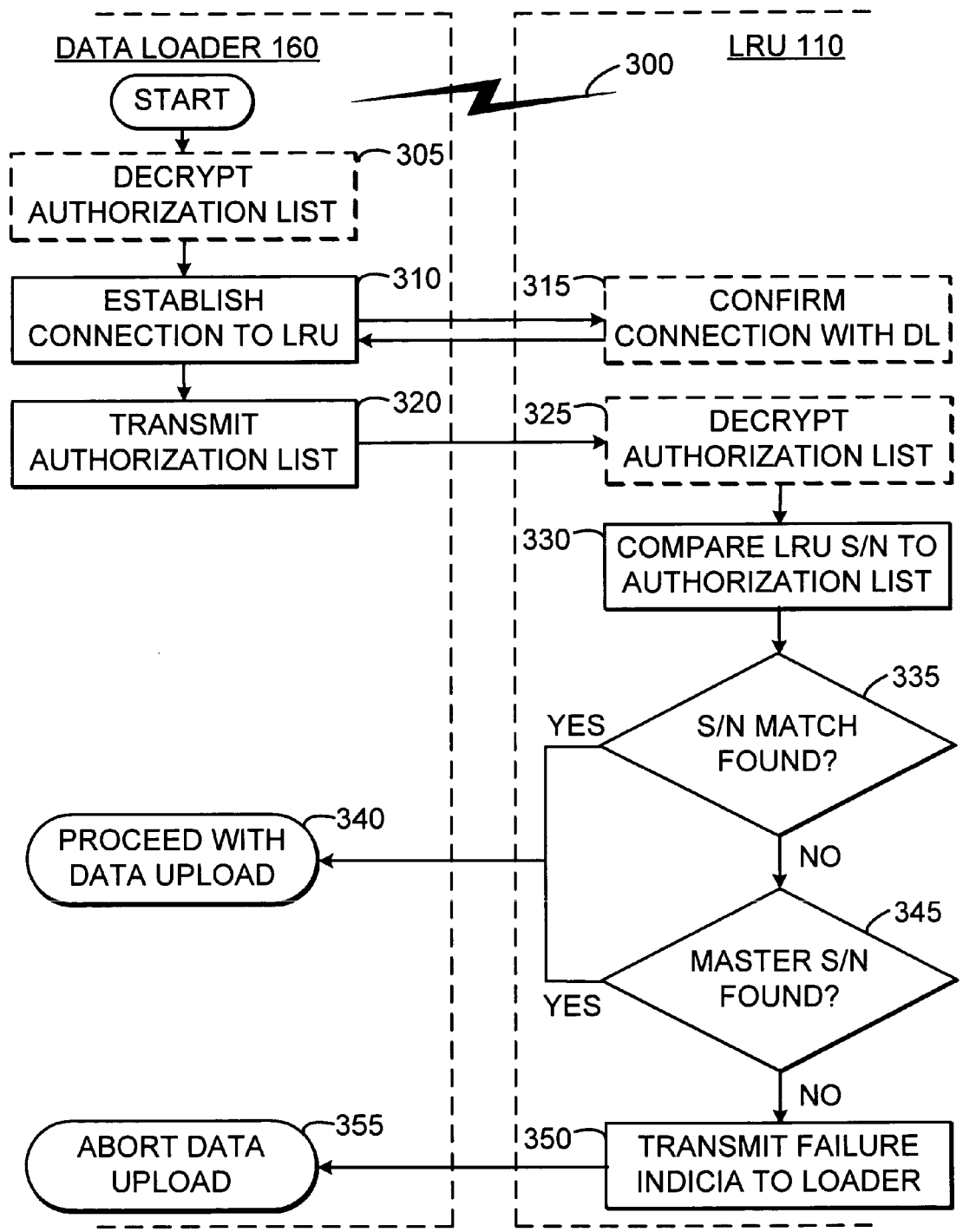
FIG. 3 illustrates a flow chart describing a first embodiment of the method of the present invention.

FIG. 3 illustrates in flow chart form, one of the embodiments of the present invention. To summarize the process illustrated in FIG. 3, an authorization list of serial numbers is transmitted by a data loader to an LRU, and if the LRU recognizes a serial as matching its own serial number or a "master" serial number, then the LRU indicates that software installation or upload is authorized, and then the user may proceed with the installation. More specifically, as shown in FIG. 3, a data loader 160 is electrically or wirelessly connected 300 to an LRU or installation target 110. The flow diagrams depict steps executed in the data loader 160 on the left side of the drawing, and steps executed in the LRU 110 on the right side. In this embodiment, a customer desires to install or download data to an LRU 110 from a set of one or more software installation media, for instance, a set of five 3.5-inch diskettes. The installation media may be comprised of any type of removable storage medium as described in the detailed description regarding FIG. 2 above. The procedure begins with an optional decryption 305 of an authorization list (FIG. 2, 210) stored on an authorization medium (FIG. 2, 200). The decryption key used in optional step 305 is supplied by the software vendor and is encoded within the data loader 160. If decrypted at this point 305, the authorization list 210 is stored as plaintext in a temporary memory in the data loader 160; otherwise, an encrypted version is stored in temporary memory of the data loader 160. Next, in step 310, software protocols in the data loader 160 establish a connection to the LRU 110, which may confirm the connection by sending connection confirmation indicia 315 back to the data loader 160. In response, the data loader 160 transmits 320 the authorization list to the LRU 110. The transmitted authorization list 210 may be in encrypted or plaintext form. Once received at the LRU 110, the authorization list 210 is optionally decrypted 325 with a decryption key encoded by the software vendor into the installation software in the LRU 110. The LRU 110 then compares 330 with a serial number stored within the LRU 110 to the serial numbers present in the decrypted or plaintext authorization list. Those skilled in the art appreciate that serial numbers stored in an LRU 110 could be stored by being burned into hardware in the LRU (such as with a programmable read only memory) or could be previously stored within the software of the LRU 110. If a match is found 335, indicia are sent by the LRU 110 to the data loader 160, instructing the data loader to prompt the user to begin the software or data installation/upload process 340. Otherwise 345, the software in the LRU 110 may optionally attempt to determine whether a master serial number, which is encoded into memory of the LRU 110, matches a number in the decrypted or plaintext authorization list. If a match is found between the master serial number and a serial number in the decrypted/plaintext authorization list, indicia are sent by the LRU 110 to the data loader 160, instructing the data loader to prompt the user to begin the installation process 340. If a match is not found between the plaintext authorization list and either a serial number of the LRU or a master serial number, indicia of authorization failure are transmitted 350 to the data loader 160, and the data loader then indicates an authorization failure, and terminates the installation or upload procedure 355.

In one embodiment of the present invention, the authorization list (FIG. 2, 210) is comprised of serial numbers that the software vendor encodes before providing the authorization medium to the customer. However, in an alternate embodiment, illustrated in flowchart form in FIG. 4, customers may add a limited number of serial numbers to the authorization list. The customer-updated authorization medium can then be used to install software or data in an LRU that corresponds either to a previously authorized LRU, or to a newly-specified LRU whose serial number was added by the customer to the authorization list. The software vendor still maintains control of the number of installations in this scenario, since the vendor encodes a countdown number (or datum) into the authorization list, specifying the number of remaining serial numbers that a customer is entitled to add, and upon each entry of a serial number, the countdown datum is decremented, and then re-encoded into the list on the medium. The computer used to execute this embodiment may be a data loader (FIG. 2, 160) or a general-purpose personal computer or laptop computer configured with software designed to execute the present invention.

Figure 4:
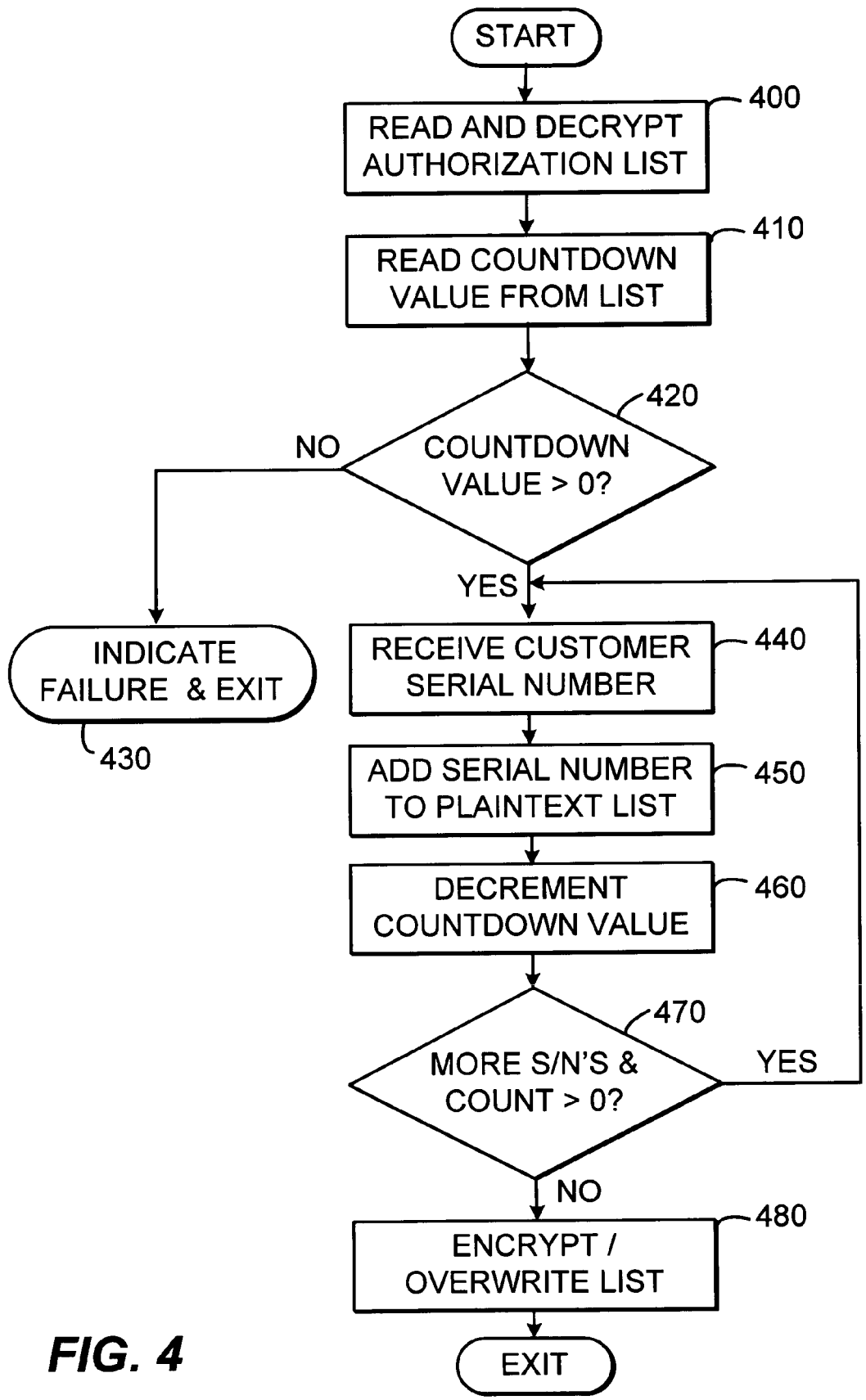
FIG. 4 illustrates an additional aspect of the present invention, whereby a vendor or a customer may add additional authorized serial numbers to an authorization list, based on a predetermined countdown datum established by the software vendor.

More specifically, in FIG. 4, a computer-based method begins by reading and decrypting 400 an authorization list (FIG. 2, 210) from an authorization medium (FIG. 2, 200). As described above, the encryption and decryption keys for the authorization list are encoded into the program that is executing the present embodiment. The resulting decrypted plaintext authorization list is comprised of a countdown datum (FIG. 2, 230) and an optional number of serial numbers (FIG. 2, 220) that had previously been added to the authorization list 210. Such serial numbers could have been pre-encoded by the software vendor, or added by the customer on a previous occasion. Next, the countdown datum 230 is read 410 from the plaintext authorization list, stored in temporary memory, and checked to see if its value is greater than zero 420. If not, indication is provided to the person executing the process that no more serial numbers may be added, and the process is terminated 430. Otherwise, the method proceeds by prompting the user, receiving a serial number 440, and then adding 450 the received serial number to the plaintext authorization list. The countdown datum stored in temporary memory is decremented 460 by the value one, reflecting the fact that one of the available serial numbers has been used. If the decremented countdown datum is still greater than zero, the user is prompted whether more serial numbers are desired to be entered into the list 470. If so, the method proceeds with step 440 to receive another serial number, otherwise, the plaintext authorization list stored in memory is encrypted into an updated second authorization list, and then the updated second authorization list is used to overwrite 480 the previous authorization list 210 stored on the authorization medium 200. After step 480, the updated authorization list is ready to be used with other embodiments of the present invention to authorize a user to install software in a targeted device.

Turning to FIG. 1 and FIG. 2 for a moment, in an alternate embodiment of the present invention, a customer utilizes a data loader to install software or upload data to an LRU, and once all the software media have been entered as directed by the prompting installation software in the LRU and data loader, the customer is then prompted to insert an authorization medium 200. A countdown value or datum that was previously encoded by the software vendor is read from the authorization medium, and if it is less than or equal to zero, the load is aborted, and the customer is informed that the software installation was not authorized. Otherwise, the data load is validated, the countdown datum decremented, and then the updated countdown datum is stored on the authorization medium. In this manner, a customer may perform a fixed number of installations/uploads, regardless of serial numbers. To explain this embodiment in more detail, a flowchart illustrates the present method in FIG. 5 continuing to FIG. 6; and similarly to the structure of FIG. 3, functional blocks shown in the left side of the diagram are executed by the data loader 160, and those functions shown on the right by the LRU 110.

Figure 5:
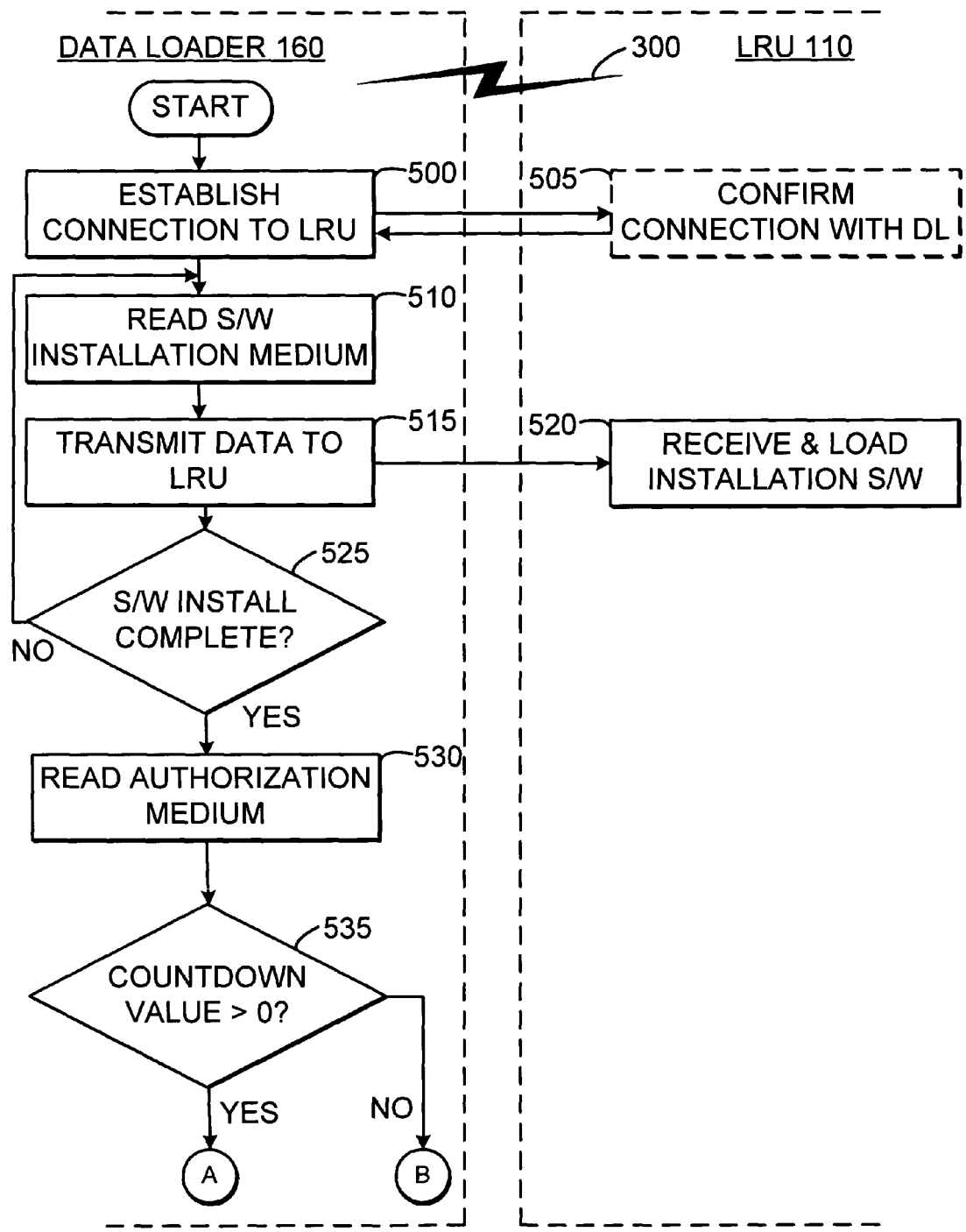
FIG. 5 illustrates a flowchart describing another embodiment of the method of the present invention.
Figure 6:
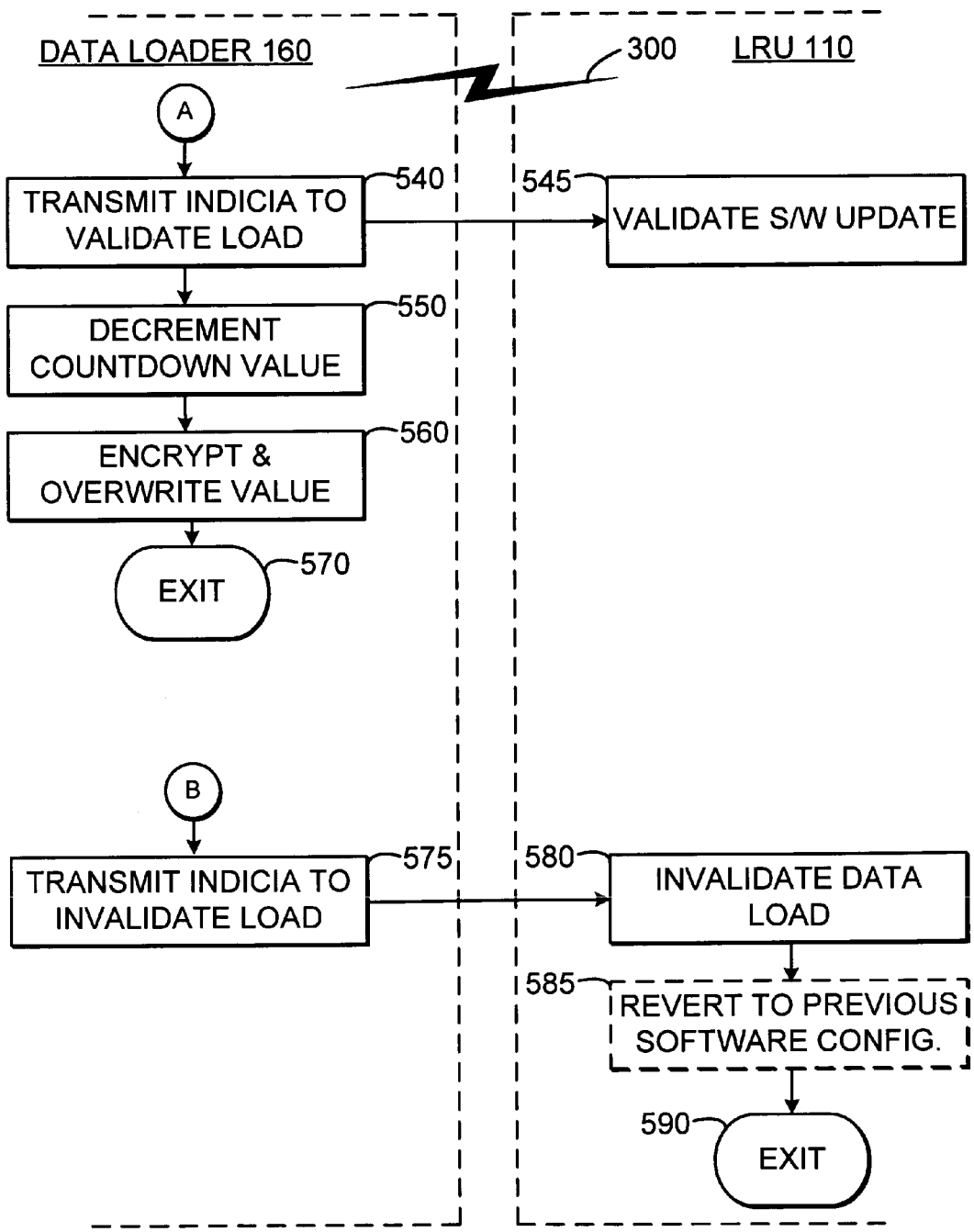
FIG. 6 is a continuation of the flowchart illustrated in FIG. 5.

In FIG. 5, an embodiment of the present invention begins with the establishment 500 of a connection 300 between a data loader 160 and an LRU or installation target 110. The connection 300 may be accomplished by a direct electrical connection, such as by an ARINC 429 bus protocol, or through a wireless standard such as 802.11b WiFi. The LRU 110, in response to the connection request, may optionally provide indicia confirming connection 505 to the data loader 160. The data loader 160 then prompts the customer to insert a software installation medium, such as a 3.5 inch diskette, into the data loader, whereupon the medium is read 510 by the data loader and stored in temporary memory, such as RAM memory, in the data loader 160. Those of skill in the art also recognize that the installation medium may be comprised of many different types, including those discussed above in regards to FIG. 2. Alternatively, the installation medium may be a hard drive in the data loader 160, and if this is the case, the installation software does not prompt a user to enter an installation medium, but instead prompts the user whether installation should begin from the desired source data. The data loader 160 then transmits 515 the installation data read from the installation medium and stored in temporary memory to the LRU 110, where it is stored for further processing 520. The installation program running on the data loader 160 and/or LRU 110 determines whether another installation medium in an installation set is required 525. If so, the customer is prompted to enter a new installation medium in the correct sequence, and the process continues with step 510 to read the next installation medium. Otherwise, the software installation or upload is completed and the customer is then prompted to insert an authorization medium 200, whereupon it is read 530 by the data loader 160 and decrypted into temporary memory. As with other embodiments of the present invention, the decryption and encryption keys necessary to access the authorization medium are encoded in the program stored in the data loader 160. The data loader 160 then determines whether a countdown datum that was decrypted from the authorization medium is greater than zero 535. Continuing now to FIG. 6., if the countdown datum value was greater than zero, indicia is transmitted 540 by the data loader 160 to the LRU 110 indicating that the software load should be validated in the LRU 110. In response, the LRU 110 validates the data load 545. The data loader 160 then decrements 550 the countdown value by one, encrypts the countdown value 560 with an encryption key previously encoded into the software by the software vendor, and overwrites the previous countdown datum stored on the authorization medium 200, and then exits the software installation process, If the countdown value had not been greater than zero in step 535, then the data loader 160 transmits indicia 575 to the LRU 110, notifying the LRU that authentication was not successful. The LRU 110 then invalidates the data load 580. Optionally, upon receiving the indicia that authorization was unsuccessful, the LRU 110 may revert to a state created by a previous software installation 585.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. One of ordinary skill in the art will recognize that the process just described may easily have steps added, taken away, or modified without departing from the principles of the present invention. Accordingly, the scope of protection is not limited to the embodiments described herein, but is only limited by the claims that follow, the scope of which shall include all equivalents of the subject matter of the claims.

What is claimed is:

1. A method for providing a secured data update, the steps comprising:
    inserting an authorization medium into a data loader, said authorization medium comprising an authorization list;
    establishing a connection between said data loader and an installation target;
    transmitting said authorization list to said installation target;
    determining whether a serial number stored within said installation target matches a serial number stored within said authorization list; and
    if a match was found in said determining step, transmitting to said data loader indicia for installation to proceed.

2. The method of claim 1, wherein if said determination step did not indicate a match, determining whether a master serial number stored within said installation target matches a serial number stored within said authorization list, and if a match occurs, transmitting to said data loader indicia for installation to proceed.

3. The method of claim 1, wherein said authorization medium is selected from the group consisting of 3.5 inch floppy diskettes, CD-ROMs, DVDs, DVD-ROMs, Bernoulli-type disks, and nonvolatile semiconductor-based memories.

4. The method of claim 1 wherein said authorization list is decrypted by said data loader.

5. The method of claim 1 wherein said authorization list is decrypted by said installation target.

6. The method of claim 1 wherein said authorization list is created by a software vendor, said authorization list comprising one or more authorized serial numbers.

7. The method of claim 6 wherein said authorization list is further comprised of a countdown datum.

8. The method of claim 7 further comprising the steps of:
    reading said authorization list from said authorization medium;
    decrypting said authorization list into a plaintext list;
    reading a countdown datum from said plaintext list;
    determining whether said countdown datum is greater than zero;
    if said countdown datum is greater than zero, performing the steps of:
        receiving a customer serial number;
        adding said customer serial number to said plaintext list; and
        decrementing said countdown datum in said plaintext list;
    encrypting said plaintext list into a second authorization list; and
    overwriting said authorization list on said authorization medium with said second authorization list.

9. A digital storage medium having computer-executable instructions stored thereon, wherein said computer-executable instructions are operable to execute the method of claim 2.

10. A digital storage medium having computer-executable instructions stored thereon, wherein said computer-executable instructions are operable to execute the method of claim 8.

11. The method of claim 1, wherein the establishing a connection step is accomplished by electrically connecting said installation target to said data loader through an ARINC standard 429 data bus.

12. The method of claim 1, wherein the establishing a connection step is accomplished by connecting said installation target to said data loader through a wireless interface.

13. The method of claim 1, wherein said data loader is configured to comply with a standard selected from the group consisting of ARINC 615, ARINC 615-3, ARINC 615-4, ARINC 615-A1 and 615-A2.

14. A method of providing a secured data update, the steps comprising:
    (a) establishing a connection between a data loader and an installation target;
    (b) inserting a software installation medium into said data loader;
    (c) reading software information from said installation medium;
    (d) transmitting said software information to said data loader;
    (e) repeating steps (b), (c) and (d) until software installation and transmission is completed;
    (f) inserting an authorization medium into said data loader;
    (g) reading and decrypting a countdown datum from said authorization medium; and
    (h) if the value of said countdown datum is greater than zero, transmitting indicia to the installation target directing the installation target to validate data load, otherwise, transmitting indicia to the installation target to invalidate data load.

15. The method of claim 14, further comprising the steps of:
(g) decrementing said countdown datum by the value of one to comprise an updated countdown datum;
(h) encrypting said updated countdown datum; and
(i) overwriting said countdown datum on said authorization medium with said encrypted updated countdown datum.

16. The method of claim 14, further comprising the step of reverting to a previous software installation in the installation target if said countdown datum is not greater than zero.

17. A digital storage medium having computer-executable instructions stored thereon, wherein said computer-executable instructions are operable to execute the method of claim 14.

18. A digital storage medium having computer-executable instructions stored thereon, wherein said computer-executable instructions are operable to execute the method of claim 16.

19. The method of claim 14, wherein the establishing a connection step is accomplished by electrically connecting said installation target to said data loader through an ARINC standard 429 data bus.

20. The method of claim 14, wherein the establishing a connection step is accomplished by connecting said installation target to said data loader through a wireless interface.

21. The method of claim 14, wherein said data loader is configured to comply with a standard selected from the group consisting of ARINC 615, ARINC 615-3, ARINC 615-4, ARINC 615-A1 and 615-A2.

22. The method of claim 14, wherein said software installation medium is selected from the group consisting of 3.5 inch floppy diskettes, CD-ROMs, DVDs, DVD-ROMs, Bernoulli-type disks, and nonvolatile semiconductor-based memories.

* * * * *